US009686022B2

(12) United States Patent
Scordilis

(10) Patent No.: US 9,686,022 B2
(45) Date of Patent: Jun. 20, 2017

(54) RF TELEMETRY TRANSMISSION BETWEEN AN ACTIVE IMPLANTABLE MEDICAL DEVICE AND A REMOTE EXTERNAL RECEIVER

(71) Applicant: SORIN CRM S.A.S., Clamart Cedex (FR)

(72) Inventor: Thierry Scordilis, Poisat (FR)

(73) Assignee: SORIN CRM SAS, Clamart (FR)

( * ) Notice: Subject to any disclaimer, the term of this patent is extended or adjusted under 35 U.S.C. 154(b) by 711 days.

(21) Appl. No.: 13/644,727

(22) Filed: Oct. 4, 2012

(65) Prior Publication Data

US 2013/0088365 A1 Apr. 11, 2013

(30) Foreign Application Priority Data

Oct. 6, 2011 (FR) ...................................... 11 59005

(51) Int. Cl.
*H04B 17/00* (2015.01)
*H04L 1/00* (2006.01)
*H04B 17/14* (2015.01)

(52) U.S. Cl.
CPC ............. *H04B 17/00* (2013.01); *H04B 17/14* (2015.01); *H04L 1/0003* (2013.01); *H04L 1/0017* (2013.01)

(58) Field of Classification Search
CPC ... H04L 1/0017; H04L 1/0018; H04L 1/0003; H04L 1/0005; G06F 19/3418; A61N 1/3727

See application file for complete search history.

(56) References Cited

U.S. PATENT DOCUMENTS 7,009,511 B2 * 3/2006 Mazar .................. A61B 5/0031
340/531
7,663,451 B2 2/2010 Dal Molin
(Continued)

FOREIGN PATENT DOCUMENTS

EP 1862195 A1 12/2007
WO WO 2006/102538 A2 9/2006

OTHER PUBLICATIONS

Foreign Search Report (Annexe Au Rapport De Recherche Preliminaire Relatif a La Demande De Brevet Francais No. FR 1159005 FA 758605), Apr. 25, 2012.

*Primary Examiner* — Brian Zimmerman
*Assistant Examiner* — Sara Samson
(74) *Attorney, Agent, or Firm* — Foley & Lardner LLP

(57) ABSTRACT

Optimized RF telemetry transmission between an active implantable medical device and a remote external receiver in which the information to be transmitted are grouped by class (TYPE 0, TYPE 1, . . . , TYPE n) according to a criticality index (IC) defining a priority rank as between the different information classes to be transmitted. A plurality of modulation schemes and of data rates characterize different transmission configurations, each with a reliability index inversely related to the probability of failure of transmission in a noisy environment. The criticality indexes of the highest priorities are assigned to the transmission configurations with the higher reliability indexes. On an information transmission request, an RF telemetry transmission configuration is selected (52-62) depending on the criticality index characterizing the information to be transmitted. The transmission is operated (64, 66) with the transmission configuration thus selected.

20 Claims, 4 Drawing Sheets

(56) References Cited

U.S. PATENT DOCUMENTS

Figure 1:
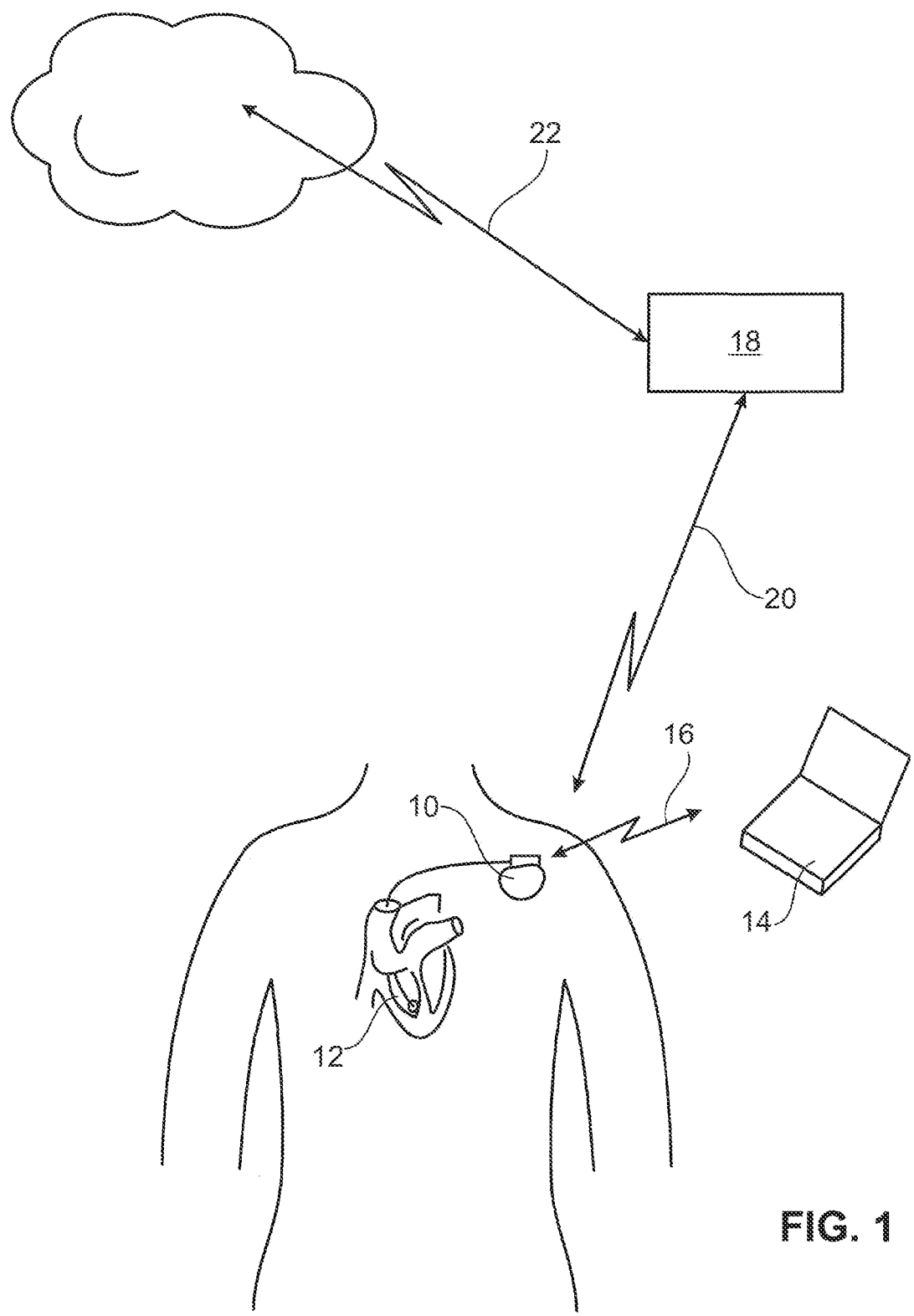

| | | | |
|---|---|---|---|
| 9,178,566 B2 * | 11/2015 | Okano | H04B 5/00 |
| 2008/0016118 A1 | 1/2008 | Fernandez | |
| 2009/0058635 A1 * | 3/2009 | LaLonde | A61N 1/37282 340/539.11 |
| 2010/0198304 A1 * | 8/2010 | Wang | A61N 1/37276 607/60 |
| 2010/0305414 A1 * | 12/2010 | Koo | A61B 5/0002 600/301 |

* cited by examiner

RF TELEMETRY TRANSMISSION BETWEEN AN ACTIVE IMPLANTABLE MEDICAL DEVICE AND A REMOTE EXTERNAL RECEIVER

RELATED APPLICATIONS

The present application claims the priority date benefit of French Patent Application No. 11/59005 filed Oct. 6, 2011 and entitled "A Method of Optimized Transmission by RF Telemetry Between an Active Implantable Medical Device And A Remote External Receiver".

FIELD OF THE INVENTION

The present invention relates to "medical devices" as defined by the Jun. 14, 1993 directive 93/42/CE of the European Community Council, and particularly to "active implantable medical devices" as defined by the Jun. 20, 1990 directive 90/395/CEE of the European Community Council. These devices include, in particular, apparatus for monitoring a patient's cardiac activity and generating if and as necessary electrical pulses for the stimulation (pacing), resynchronization, defibrillation and/or cardioversion of the patient's heart in response to an arrhythmia detected by the device. These devices also include neurological devices, pumps for diffusion of medical substances, cochlear implants, implanted biological sensors, etc., and devices for measuring pH or intracorporeal impedance (such as transpulmonary or intracardiac impedance measurements).

It should be understood that although the present invention is particularly advantageously applicable to implanted devices such as pacemakers, cardioverter or defibrillators, it may equally well be implemented with non-implanted medical devices, such as data recorders like external Holter devices intended for ambulatory monitoring and recording of physiological parameters such as, for example, cardiac activity.

BACKGROUND

Most active medical devices are designed to enable data exchange with a "programmer", which is a term used to refer to an external device variously used to verify the configuration of the device, to read information the device has recorded, to post information to the device, to update the internal software and/or firmware of the device. This data exchange between the medical device and the programmer is typically performed by telemetry, that is to say, by a technique for remote transmission of information without galvanic contact.

Telemetry has most often been performed by an inductive coupling between coils of the implanted device and of the programmer, which technique is known as the "induction method". Because the coupling requires a very close distance between the coils, this technique has the particular disadvantage of requiring a "telemetry head" connected to the programmer, which contains a coil an operator places in the vicinity of the site where the device is implanted.

It has recently been proposed to implement another non-galvanic telemetry coupling technique, using the two components of an electromagnetic wave generated by transmitter/receiver circuits operating in the radiofrequency (RF) domain, typically in the range of frequencies of several hundred megahertz. This technique, known as "RF telemetry", allows programming or interrogating medical devices, including implanted devicesm at distances greater than 3 m, and therefore permits the exchange of information without handling of a telemetry head, and even without any external operator intervention. One such active medical device implementing such an RF telemetry is for example described in EP 1862195 A1 and its counterpart U.S. Pat. No. 7,663, 451 (both assigned to Sorin CRM S.A.S., previously known as ELA Medical).

The communication protocol between the active device (usually an implanted device) and the base station (i.e., the programmer of a "home monitor" device) is particularly governed by standard EN 301 839 Electromagnetic Compatibility and Radio Spectrum Matters (ERM)—Short range devices (SRD)—Ultra Low Power Active Medical Implants (ULP-AMI) and Peripherals (ULP-AMI-P) operating in the frequency range 402 MHz to 405 MHz. It should be understood, however, that the present invention is not limited to use in the Medical Implants Communication Systems (MICS) band of 402-405 MHz, but is generally applicable to all bands that could be used for RF telemetry, including Industrial, Scientific and Medical (ISM) public unmarked bands 863-870 MHz, 902-928 MHz and 2.4 GHz used by medical devices.

RF telemetry is, however, subject to many disturbances in the electromagnetic environment, including signals from radio, television and mobile telephony, plus many specific parasites that may be produced in the immediate vicinity of the implanted patient (e.g., in hospitals). All these disturbances are likely to cause interferences and disrupt data transmission.

Also, unlike induction method transmissions which have good noise immunity, it is not certain that an RF telemetry transmission can be carried to completion without interruption. If there are too many unrecoverable errors in the transmission, the ongoing transmission process must be abandoned and started over (completely repeated), preferably with new transmission parameters (e.g., another type of modulation (or modulation scheme), reduced transmission data rate, selection of a different channel). In such case, the energy that was spent for the failed communication becomes wasted.

However, the RF telemetry involves relatively high energy consumption, at least at the scale of an implanted device whose autonomy (including its useful life) is an extremely critical parameter. Consequently, multiple interrupted communications can in the long term have a significant impact on autonomy of the device.

For the optimization of transmission, it is important to choose, before starting to send the data, a specific modulation scheme and a data rate level, which determine the communication link performance. These parameters of modulation scheme and data rate (which are collectively called "transmission configuration") are factors involved in the so-called "link budget", that is to say to what the device has to run the RF telemetry transmission application.

The link budget is related to the applicable distance over which the data transmitted by the implanted device can be received. It includes the basic parameters of the various functional elements implemented: antenna gain, transmission power, and transmission channel bandwidth (the latter being directly related to the modulation scheme and the data rate used).

In case of limit conditions on the link budget, the good or bad transmission sequence should be monitored, so as to possibly alter the transmission configuration in case of failure before any reiteration of the transmission.

Thus, U.S. Pat. Publication No. 2010/0198304 A1 proposes to evaluate during transmission a metric of quality of service (QoS) and to modify if necessary the modulation scheme based on that assessment. The disadvantage of this method is that it needs to be first confronted with the problem and thereafter react to the problem to change the modulation scheme. The purpose is then to operate an "on the fly" reconfiguration, with a significant time lost between the time the device decides to change the transmission configuration and when the transmission can be restarted with the new configuration.

Indeed, the changes needed are not instantaneous as the clock system has to be reestablished, re-synchronized, as a reset of the transmission packet preamble for hardware synchronization has to be performed. These changes are time consuming and delay the availability of data at the device reception side, which is a serious drawback when the data is critical.

Finally, even after a transmission configuration change, it cannot be ensured that the new transmission configuration is optimal—it is indeed required to wait for a new QoS evaluation factor to know.

Another aspect of the choice of the transmission configuration, besides the greater or lesser probability of failure in a noisy environment, is the possibility of increasing the link budget by reducing the data rates, and thus the bandwidth, and consequently the impact of noise in the band. This reduction provides a gain on the applicable propagation distance (typically, the patient's room) and/or improved immunity against environmental variability for a given distance (typically, the environment of an operation room). But a reduction in the data rate is accompanied of course by a longer transmission duration, which can sometimes be a disadvantage.

The problem recognized to exist by the inventor is to find a technique to directly determine the best transmission configuration among several options, that determination being made a priori before starting to transmit.

Being able to directly use the best available transmission configuration rather than to try several ones before getting to the right one—as in the techniques implementing a QoS metric—is a factor that can provide a significant gain in both (i) reduced energy consumption, and hence an improved life duration of the device, and (ii) availability of information to the recipient (e.g., the remote programmer that retrieves data sent by the device).

This aspect is particularly important in the case of "control/command" communication phases between a programmer and an implanted device: in the latter case, the data rate (transmission speed) is not critical (the size of data is generally not very large), but instead the fact that they are actually received (deterministic reception) is very important.

OBJECT AND SUMMARY

It is, therefore, an object of the present invention to optimize the selection of the transmission configuration, so as to find, depending on specific classes of information to transmit, the best compromise between securing the delivery of information to the destination device and transmission speed (data rate), while minimizing the risks of repeated trials (retransmissions) following tests/errors, thereby minimizing the energy consumption of the device associated with the transmission.

The starting point of the present invention is that a priori the type of data to be transmitted (e.g., the data stored in the device) is known, and therefore whether the data is relatively more or less critical to transmit to the receiver (programmer).

Broadly, the present invention directly adapts the transmission configuration parameters according to the criticality of the information to be transmitted, and not according to a QoS parameter measured retrospectively once a transmission is triggered. Thus, the most critical data are advantageously transmitted with the safest transmission parameters, meaning those parameters that offer the greatest probability of successful transmission on the first try. In this method, the RF telemetry transmission is directly and immediately optimized, and not gradually as it progresses, as in the prior art.

One aspect of the invention is directed to a method of RF telemetry transmission, which provides, prior to the transmission of information, the following steps:

Characterizing information to be transmitted, by grouping it into classes of information and allocating to each class of information a criticality index setting a priority rank between the different classes of information to be transmitted;

Defining a plurality of possible transmission configurations (wherein each transmission configuration is defined by at least one characteristic: modulation scheme, setting of the modulation scheme and a transmission data rate);

Characterizing the transmission configurations thus defined, by assigning to each transmission configuration a reliability index inversely related to the probability of failure of transmission according to the transmission configuration in a noisy environment, and Providing an ordered linking of the criticality indices with the transmission configurations, the criticality indices of the highest priorities being allocated to the transmission configurations with the higher reliability indices, and vice versa.

Later, on an information transmission request, the active implantable device selects one of these transmission configurations depending on the criticality index characterizing the information to be transmitted and issues, with the transmission configuration thus selected, a message containing the information to be transmitted according to the selected transmission configuration.

In case of a transmission request of a plurality of information to be transmitted in sequence, it is possible to issue a plurality of successive sub-messages, each having a different transmission configuration, and each of these sub-messages containing the information characterized by the same criticality index. The successive sub-messages are preferably transmitted starting with those gathering the information characterized by the indexes of the highest criticality.

The modulation schemes may in particular be chosen from the group consisting of: FSK (Frequency Shift Keying) modulation, GFSK (Gaussian Frequency Shift Keying) modulation, PSK (Phase Shift Keying) modulation, QPSK (Quadrature Phase Shift Keying) modulation, OQPSK (by Orthogonal Quadrature Phase Shift) modulation, MSK (Minimum Shift Keying) modulation, SF (Spread Spectrum) modulation or OOK (all-or-nothing) modulation. The transmission data rate can be chosen in the range: 2 kbps, 16 kbps, 32 kbps, 100 kbps, 200 kbps and 400 kbps.

DRAWINGS

Figure 2:
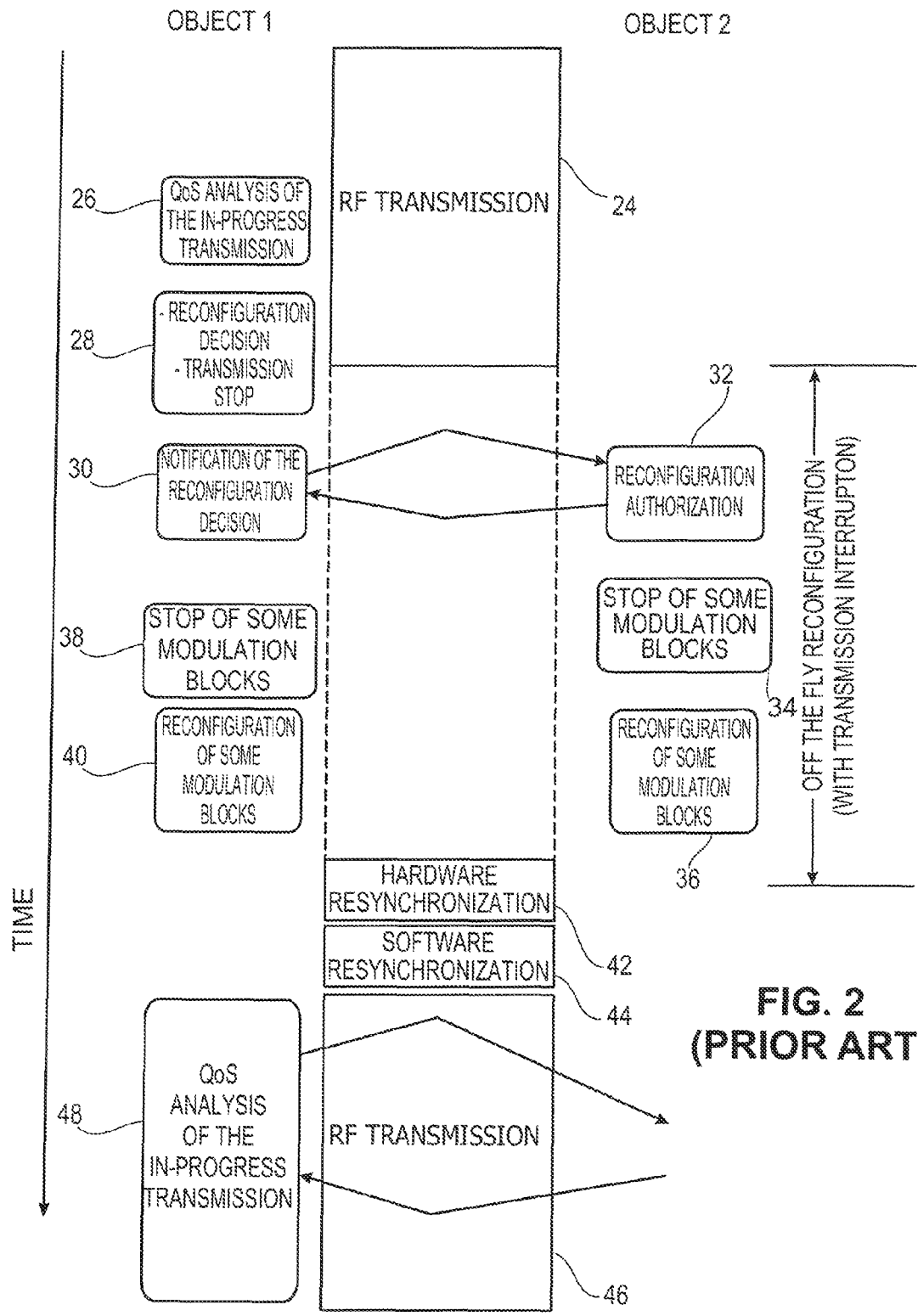
Figure 3A:
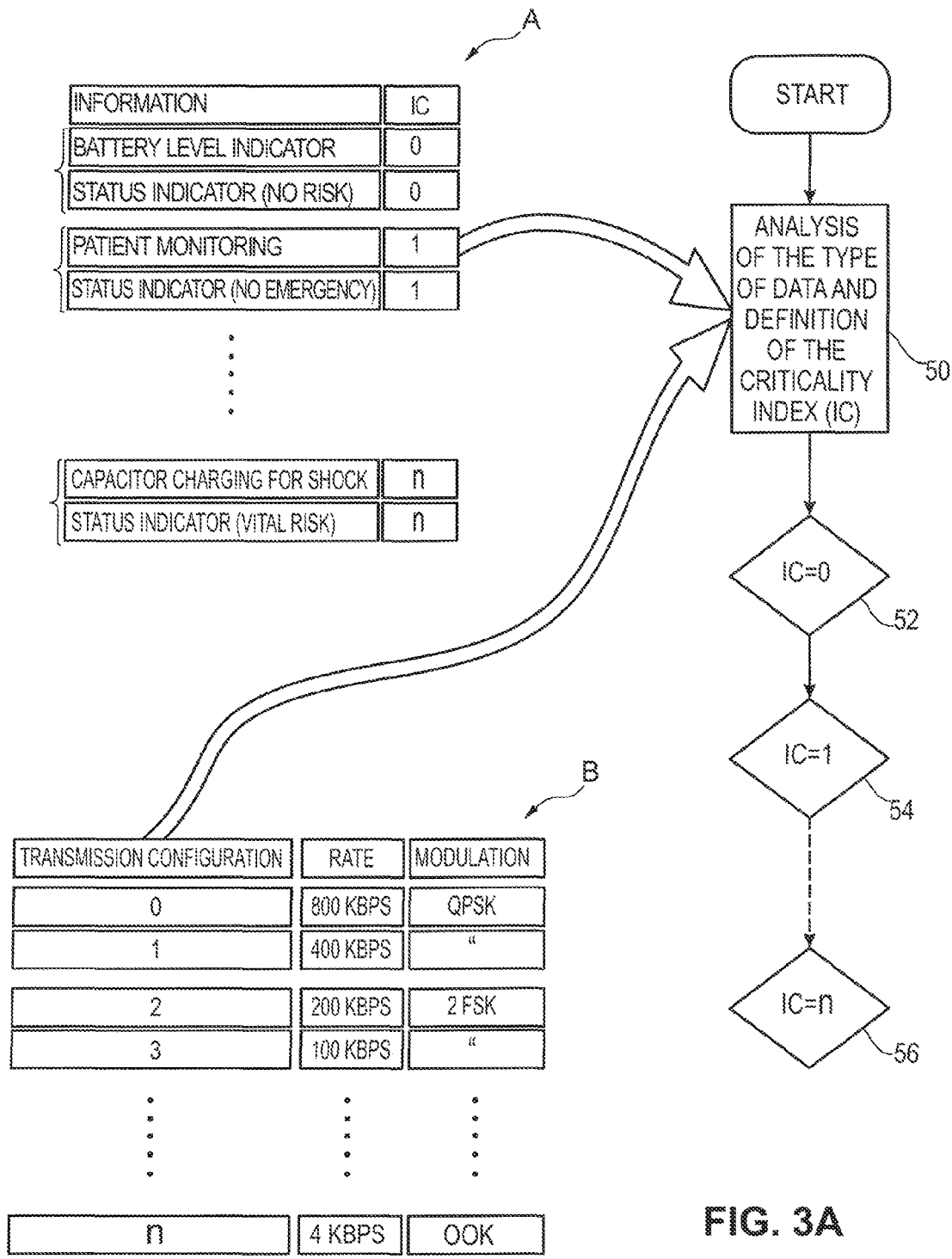
Figure 3B:
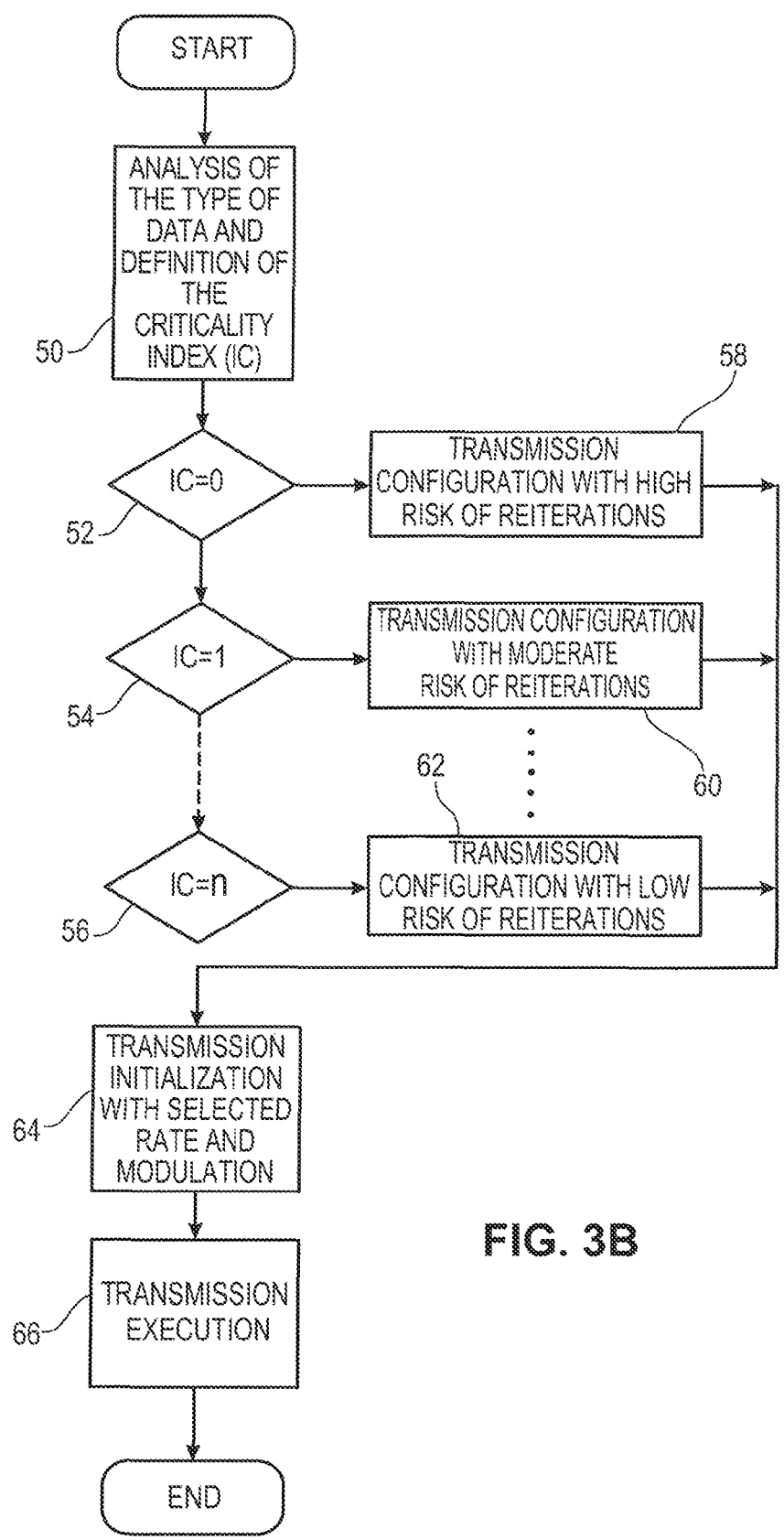

Further features, characteristics and advantages of the present invention will become apparent to a person of ordinary skill in the art from the following detailed description of preferred embodiments of the present invention, made with reference to the drawings annexed, in which like reference characters refer to like elements, and in which:

FIG. 1 schematically illustrates a set of medical devices communicating with each other via RF telemetry, one of these devices being implanted in the body of a patient;

FIG. 2 schematically shows a prior art method to implement a reconfiguration of the transmission configuration; and FIGS. 3A and 3B are a flow chart showing the steps implemented by the method of the present invention for the determination of the optimal transmission configuration depending on the criticality of information to be transmitted.

DETAILED DESCRIPTION

With reference to the drawings, FIGS. 1-3, an example of a preferred method of the present invention will now be described.

This process is mainly executed by software instruction, by appropriate algorithms executed by a microcontroller, a digital signal processor or a solid state machine. For the sake of clarity, the various processing sequences used are decomposed and diagrammed by a number of different functional blocks in the form of interconnected circuits. This representation is merely illustrative, however, these circuits including common elements and corresponding in practice to a plurality of functions generally performed by the same software.

With reference to FIG. 1, a set of devices such as an implantable device 10, e.g., a defibrillator/pacemaker/resynchronizer, is illustrated, equipped with a lead 12 disposed in the myocardium (the invention being of course not limited to this particular type of implantable device). An RF telemetry communication can be established between device 10 and, on the one hand, a remote programmer 14 by an RF telemetry link 16, and/or on the other hand with a housing 18 located at a greater distance, for example, in the hospital room, by an RF telemetry link 20. Housing 20 can notably be a home monitoring housing (remote monitoring), connected by a data link 22 to a remote server (represented by the clock) that can monitor the patient and analyze in real or delayed time information collected by device 10.

The RF telemetry is typically operated in the MICS or ISM bands with a given "transmission configuration", which term shall include:

The selected modulation scheme, e.g. FSK, GFSK, etc.,
The eventual parameter of the selected modulation scheme: for example 2-FSK, 4-FSK . . . and
The selected data rate for the transmission: for example, 400 kbps (kilobits per second), 200 kbps, . . . 16 kbps, 2 kbps, and this in a preselected communication channel following the standards and regulations in force, thus with an allocated bandwidth corresponding to the width of this channel.

With reference to FIG. 2, a device operating according to the prior art is shown with the sequencing of various steps of an RF telemetry transmission configuration change during transmission. In this case, during the course of an RF telemetry transmission (step 24), an analysis of the quality (QoS) metric of the current transmission is made by one of the two transmitter/receiver objects (programmer or device), for example, the first object (step 26).

If this analysis shows a poor quality level, e.g., based upon too many transmission failures resulting in repeated sequences of messages being sent (retransmissions), a reconfiguration decision is taken, and the transmission is halted (step 28).

This reconfiguration decision is indicated to the other transmitter/receiver, for example, a second object (step 30), which authorizes it (step 32). This has the effect of causing the stop of a number of modulation blocks (step 34) and the reconfiguration of the characteristics of the transmission configuration: modulation scheme, setting the modulation scheme and/or data rate (steps 34 and 36).

The corresponding operations are carried out by the second other object, on its side (steps 38 and 40). So that the first and second objects can share the information again, it is necessary to operate a hardware and software resynchronization (steps 42 and 44) with reconstruction of the clock system, recovery of the synchronization, reset of the packet preambles, etc. These processes are conventional and well understood by persons of ordinary skill in the art.

The transmission can then be restored (step 46). It is however not certain that the changes that were made are optimal, and a QoS analysis of the retransmission according to the new current transmission configuration is therefore necessary (step 48).

As can be seen, the interruption time required to reconfigure on the fly the transmission parameters, i.e., the interval between steps 24 and 46, is particularly long because of the many operations to be performed by each of the two objects so that they can communicate with each other again on the basis of the new transmission configuration.

Another disadvantage is that one can only know a posteriori if the new transmission configuration is optimal, by the QoS analysis of the new transmission after changing the characteristics of the transmission configuration. If the new configuration is not optimal, there is a risk of being in a situation that may lead again to a decision of reconfiguration, with an interruption of the ongoing transmission.

The basic idea of the present invention is to overcome these drawbacks, by minimizing the number of potential changes, and by directly choosing the safest transmission configuration in terms of the class information to be transmitted. The solution of the present invention, with reference to FIGS. 3A and 3B, is illustrated as follows:

i. Assign each class of information a criticality index for prioritizing the different information to be transmitted according to their relative degree of importance (as indicated by Table A in FIG. 3A);

ii. Characterize the possible transmission configurations, by assigning each a reliability index based on the probability of failure of transmission in a noisy environment (as indicated by Table B in FIG. 3A); and iii. Orderly associate the criticality indexes with the transmission configurations, the criticality indexes of the highest priorities being allocated to transmission configurations with higher reliability indexes, and vice versa.

To do this, the different information that may be transmitted are first grouped into "information classes" to which respective "criticality indices" (IC) are attributed, the index being as high as the corresponding information is critical and must be transmitted with priority, and with the greatest degree of safety (that is to say maximally avoiding the risk of transmission interruption). Thus, criticality indices can be, for example:

IC=0 (minimum criticality) e.g., for: indication of the battery level of the implant, indicator of a status corresponding to no risk to life of the patient, and more generally information the principal purpose of which is to provide a better understanding of the implanted device system;

IC=1:, e.g., general information on patient follow-up (date of last visit, etc.), and more generally information that is an indicator of a status not requiring any action at short notice; and

: ;

: ;

: ; and

IC=n (maximum criticality):, e.g., a report that the capacitor charges for the delivery of a defibrillation shock, status indicator corresponding to a vital risk for the patient, serious malfunction of operation.

Similarly, the different possible transmission configurations are prioritized, assigning each a reliability index inversely with the probability of failure of transmission in a noisy environment. The corresponding index is thus minimal for the configuration providing the least reliable transmission (but, on the other hand, usually the fastest one), and maximum for that ensuring the most reliable transmission (but usually the slowest one). For example, we have, from the least reliable (the fastest) to the most reliable (the slowest):

800 kbps QPSK,
400 kbps QPSK,
200 kbps 2-FSK,
100 kbps 2-FSK,
4 kbps OOK.

The modulation schemes of the various transmission configurations can be chosen—but not limited to—from:

FSK modulation (Frequency Shift Keying),
GFSK modulation (Gaussian Frequency Shift Keying),
Modulation PSK (Phase Shift Keying),
QPSK modulation (Quadrature Phase Shift Keying),
OQPSK modulation (Orthogonal Quadrature Phase Shift Keying),
MSK (Minimum Shift Keying),
SF modulation (Spread Spectrum), or
OOK modulation (all-or-nothing),
with eventually for some modulations different modulation scheme parameters (4-FSK, 2-FSK . . . ).

The noise immunity increases with the index assigned to the transmission configuration, thereby reducing the risk of interruption of transmission, and/or enabling a greater distance transmission without risk of interruption.

Thus, between 2-FSK modulation at 400 kbps and 2-FSK modulation at 4 kbps, the sensitivity increases from 93 dBm to 112 dBm, a gain of 19 dB—but with at a rate one hundred times less (note that, ideally, the application range doubles every 6 dB).

At the two extreme levels of possible transmission configurations in the examples given here, between QPSK modulation at 800 kbps and OOK modulation at 4 kbps, there is a sensitivity gain of nearly 50 dB, covering all possible situations.

With respect to FIG. 3B, the different steps of the transmission performed according to an embodiment of the present invention are illustrated. This transmission can take place after the information classes have been defined (step 50), each with its respective criticality index, as outlined above.

Then, depending on the higher or lower criticality index IC (tests 52, 54 . . . 56), the system sets up a relationship of this criticality index with a transmission configuration. A corresponding transmission configuration is thus selected (steps 58, 60 . . . 62) among those listed in Table B in FIG. 3A, to match in the most appropriate method to the nature of the information to be transmitted, reflected by its criticality index IC (the criticality indexes of the highest priorities being allocated to transmission configurations with higher reliability indexes, and vice versa).

The transmission can then be initialized with the data rate, the modulation scheme and the parameter of modulation scheme thus selected (step 64), and then executed on this basis (step 66).

In case of a plurality of information classes to be transmitted, it is possible either to transmit all the information in a single message, on the basis of a transmission configuration corresponding to the index of the highest criticality, or to divide this message into sub-messages, which are issued each with a different transmission configuration for messages with different criticality indexes. These successive sub-messages are then sent, starting with those gathering the information characterized by the indexes of the highest criticality.

In the case of low criticality information, another option is to delay the sending of the corresponding messages, to avoid consuming battery power of the implanted device for the transmission of information that are a priori not of major interest. The transmission of this information can thus be made on another occasion, for example, during a visit to the doctor instead of being on a daily basis. This avoids unnecessary consumption of energy, without creating a risk regarding the patient's health created by the alteration of his monitoring.

One skilled in the art will appreciate that the present invention can be practiced by embodiments other than those described herein, which are provided for purposes of illustration and explanation, and not of limitation.

The invention claimed is:

1. A method for transmission of information from an active implantable medical device to a remote external receiver by RF telemetry, comprising:

prior to the transmission of information:
characterizing information to be transmitted according to one of a plurality of classes of information (TYPE 0, TYPE 1, . . . , TYPE n) and assigning to each said class of information a criticality index (IC) defining a relative priority between the different information classes to be transmitted;
defining of a plurality of possible transmission configurations (0, 1, . . . , n), each transmission configuration being defined by a characteristic comprising at least one of a modulation scheme, a setting of the modulation scheme and a data rate;
characterizing said transmission configurations thus defined by assigning to each transmission configuration a reliability index that is inversely related to a probability of failure of transmission in a noisy environment, the reliability index assigned to each transmission based on the characteristic without utilizing quality metrics measured during prior transmissions using the transmission configurations;
providing an ordered connection of said criticality indexes with the transmission configurations, the criticality indexes of the highest priorities being allocated to transmission configurations with higher reliability indexes, and vice versa, providing the ordered connection comprising:
assigning a first criticality index to a first transmission configuration comprising a first data rate; and
assigning a second criticality index having a lower priority than the first criticality index to a second transmission configuration comprising a second data rate higher than the first data rate; and by the active implantable device, in response to a request for information to be transmitted:
prior to beginning transmission of the information, selecting a transmission configuration according to the criticality index characterizing the requested information to be transmitted, and
transmitting a message containing the requested information to be transmitted with the selected transmission configuration.

2. The method of claim 1, comprising, in response to a request by the active implantable device for transmission of a plurality of information to be transmitted in sequence:
transmitting a plurality of successive sub-messages with, for each sub-message, a different transmission configuration, each of said sub-messages containing the information characterized by the same criticality index.

3. The method of claim 2, wherein the successive sub-messages are transmitted starting with those containing the information characterized by the criticality indexes of the highest criticality.

4. The method of claim 1, wherein the modulation schemes are at least one of: FSK (Frequency Shift Keying) modulation, GFSK (Gaussian Frequency Shift Keying), PSK (Phase Shift Keying) modulation, QPSK (Quadrature Phase Shift Keying) modulation, OQPSK (Orthogonal Quadature Phase Shift Keying), MSK (Minimum Shift Keying) modulation, SF modulation with spread spectrum, and OOK modulation in all-or-nothing.

5. The method of claim 1, wherein the data rates of the various transmission configurations are at least one of: 2 kbps, 16 kbps, 32 kbps, 100 kbps, 200 kbps and 400 kbps.

6. The method of claim 1, further comprising, in response to a request by the active implantable device for transmission of a plurality of information to be transmitted in sequence:
delaying the sending of messages with a criticality index under a threshold criticality index.

7. The method of claim 6, further comprising, in response to a second request by the active implantable device for transmission of a plurality of information to be transmitted in sequence:
transmitting a message containing the requested information to be transmitted with the selected transmission configuration and the messages with the criticality index under the threshold criticality index that were delayed.

8. A system for transmission of information from an active implantable medical device to a remote external receiver by RF telemetry, the system comprising:
at least one processor coupled to an electrode, wherein the at least one processor is configured to:
prior to the transmission of information:
characterize information to be transmitted according to one of a plurality of classes of information (TYPE 0, TYPE 1, . . . , TYPE n) and assigning to each said class of information a criticality index (IC) defining a relative priority between the different information classes to be transmitted;
define a plurality of possible transmission configurations (0, 1, . . . , n), each transmission configuration being defined by a characteristic comprising at least one of a modulation scheme, a setting of the modulation scheme and a data rate;
characterize said transmission configurations thus defined by assigning to each transmission configuration a reliability index that is inversely related to a probability of failure of transmission in a noisy environment, the reliability index assigned to each transmission based on the characteristic without utilizing quality metrics measured during prior transmissions using the transmission configurations;
provide an ordered connection of said criticality indexes with the transmission configurations, the criticality indexes of the highest priorities being allocated to transmission configurations with higher reliability indexes, and vice versa, providing the ordered connection comprising:
assigning a first criticality index to a first transmission configuration comprising a first data rate; and
assigning a second criticality index having a lower priority than the first criticality index to a second transmission configuration comprising a second data rate higher than the first data rate; and
in response to a request for information to be transmitted:
prior to beginning transmission of the information, select a transmission configuration according to the criticality index characterizing the requested information to be transmitted prior to a first transmission, and
transmit a message containing the requested information to be transmitted with the selected transmission configuration.

9. The system of claim 8, wherein the processor is further configured to, in response to a request by the active implantable device for transmission of a plurality of information to be transmitted in sequence:
transmit a plurality of successive sub-messages with, for each sub-message, a different transmission configuration, each of said sub-messages containing the information characterized by the same criticality index.

10. The system of claim 9, wherein the successive sub-messages are transmitted starting with those containing the information characterized by the criticality indexes of the highest criticality.

11. The system of claim 8, wherein the modulation schemes are at least one of: FSK (Frequency Shift Keying) modulation, GFSK (Gaussian Frequency Shift Keying), PSK (Phase Shift Keying) modulation, QPSK (Quadrature Phase Shift Keying) modulation, OQPSK (Orthogonal Quadature Phase Shift Keying), MSK (Minimum Shift Keying) modulation, SF modulation with spread spectrum, and OOK modulation in all-or-nothing.

12. The system of claim 8, wherein the data rates of the various transmission configurations are at least one of: 2 kbps, 16 kbps, 32 kbps, 100 kbps, 200 kbps and 400 kbps.

13. The system of claim 8, wherein the processor is further configured to, in response to a request by the active implantable device for transmission of a plurality of information to be transmitted in sequence:
delay the sending of messages with a criticality index under a threshold criticality index.

14. The system of claim 13, wherein the processor is further configured to, in response to a second request by the active implantable device for transmission of a plurality of information to be transmitted in sequence:
transmit a message containing the requested information to be transmitted with the selected transmission configuration and the messages with the criticality index under the threshold criticality index that were delayed.

15. One or more non-transitory computer-readable storage media having instructions stored thereon that, when executed by a processor of an active implantable medical device, cause the processor to implement operations including:
  prior to the transmission of information:
    characterizing information to be transmitted according to one of a plurality of classes of information (TYPE 0, TYPE 1, ..., TYPE n) and assigning to each said class of information a criticality index (IC) defining a relative priority between the different information classes to be transmitted;
    defining of a plurality of possible transmission configurations (0, 1, ..., n), each transmission configuration being defined by a characteristic comprising at least one of a modulation scheme, a setting of the modulation scheme and a data rate;
    characterizing said transmission configurations thus defined by assigning to each transmission configuration a reliability index that is inversely related to a probability of failure of transmission in a noisy environment, the reliability index assigned to each transmission based on the characteristic without utilizing quality metrics measured during prior transmissions using the transmission configurations;
    providing an ordered connection of said criticality indexes with the transmission configurations, the criticality indexes of the highest priorities being allocated to transmission configurations with higher reliability indexes, and vice versa, providing the ordered connection comprising:
      assigning a first criticality index to a first transmission configuration comprising a first data rate; and
      assigning a second criticality index having a lower priority than the first criticality index to a second transmission configuration comprising a second data rate higher than the first data rate; and
  in response to a request for information to be transmitted:
    prior to beginning transmission of the information, selecting a transmission configuration according to the criticality index characterizing the requested information to be transmitted prior to a first transmission, and
    transmitting a message containing the requested information to be transmitted with the selected transmission configuration.

16. The one or more non-transitory computer-readable storage media of claim 15, wherein the implement operations of the processor further include, in response to a request by the active implantable device for transmission of a plurality of information to be transmitted in sequence:
  transmitting a plurality of successive sub-messages with, for each sub-message, a different transmission configuration, each of said sub-messages containing the information characterized by the same criticality index.

17. The one or more non-transitory computer-readable storage media of claim 16, wherein the successive sub-messages are transmitted starting with those containing the information characterized by the criticality indexes of the highest criticality.

18. The one or more non-transitory computer-readable storage media of claim 15, wherein the modulation schemes are at least one of: FSK (Frequency Shift Keying) modulation, GFSK (Gaussian Frequency Shift Keying), PSK (Phase Shift Keying) modulation, QPSK (Quadrature Phase Shift Keying) modulation, OQPSK (Orthogonal Quadature Phase Shift Keying), MSK (Minimum Shift Keying) modulation, SF modulation with spread spectrum, and OOK modulation in all-or-nothing.

19. The one or more non-transitory computer-readable storage media of claim 15, wherein the data rates of the various transmission configurations are at least one of: 2 kbps, 16 kbps, 32 kbps, 100 kbps, 200 kbps and 400 kbps.

20. The one or more non-transitory computer-readable storage media of claim 15, wherein the operations further comprise, in response to a request by the active implantable device for transmission of a plurality of information to be transmitted in sequence:
  delaying the sending of messages with a criticality index under a threshold criticality index; and
  in response to a second request by the active implantable device for transmission of a plurality of information to be transmitted in sequence, transmitting a message containing the requested information to be transmitted with the selected transmission configuration and the messages with the criticality index under the threshold criticality index that were delayed.

* * * * *